(12) United States Patent
Yamane et al.

(10) Patent No.: US 7,421,915 B2
(45) Date of Patent: Sep. 9, 2008

(54) NONDESTRUCTIVE INSPECTION APPARATUS

(75) Inventors: Tadashi Yamane, Tokyo (JP); Yasuhiko Katsube, Tokyo (JP); Takashi Sato, Tokyo (JP); Albert J. Parvin, San Antonio, TX (US); Rolf Glauser, San Antonio, TX (US); James F. Crane, San Antonio, TX (US)

(73) Assignee: The Tokyo Electric Power Company, Incorporated, Tokyo (JP)

( * ) Notice: Subject to any disclaimer, the term of this patent is extended or adjusted under 35 U.S.C. 154(b) by 259 days.

(21) Appl. No.: 11/388,800

(22) Filed: Mar. 24, 2006

(65) Prior Publication Data

US 2007/0223643 A1 Sep. 27, 2007

(51) Int. Cl.
*G01N 19/00* (2006.01)

(52) U.S. Cl. ..................................... 73/865.8

(58) Field of Classification Search ........................ None
See application file for complete search history.

(56) References Cited

U.S. PATENT DOCUMENTS

| 4,311,556 | A | * | 1/1982 | Iwamoto et al. | 376/249 |
| 4,355,536 | A | * | 10/1982 | McShane et al. | 73/633 |
| 4,638,667 | A | * | 1/1987 | Zimmer et al. | 73/866.5 |
| 5,156,803 | A | * | 10/1992 | Engding et al. | 376/249 |
| 5,661,242 | A | * | 8/1997 | Schreiner et al. | 73/623 |
| 6,452,384 | B1 | * | 9/2002 | Becker et al. | 324/240 |
| 6,550,334 | B2 | * | 4/2003 | Kodama et al. | 73/622 |
| 6,640,655 | B1 | * | 11/2003 | Manzak et al. | 73/865.8 |
| 7,068,029 | B2 | * | 6/2006 | Hatcher et al. | 324/239 |
| 2006/0017434 | A1 | * | 1/2006 | Tenley et al. | 324/238 |

* cited by examiner

*Primary Examiner*—Robert R Raevis
(74) *Attorney, Agent, or Firm*—Muramatsu & Associates

(57) ABSTRACT

A nondestructive inspection apparatus is designed to inspect components in a small gap of a structure. A main body 19 of the nondestructive inspection apparatus is positioned on a spray line header 13 connected to a thermal sleeve 16 within a cooling water inlet nozzle 12, and fixed to a core spray line 14 by vertically clamping the core spray line 14 with fixing units 21*a*, 21*b* at the position where the thermal sleeve 16 to be inspected is located. Scanners 24*a*, 24*b* insert a tape probe 27 having an inspection head 28 inside an annular gap 17 formed between the thermal sleeve 16 and the cooling water inlet nozzle 12 in an axial direction. The scanners 24*a*, 24*b* are guided by guide rails 22*a*, 22*b* to move the tape prove 27 so that the inspection head 28 can move in the circumferential direction of the annular gap 17.

20 Claims, 8 Drawing Sheets

NONDESTRUCTIVE INSPECTION APPARATUS

FIELD OF THE INVENTION

This invention relates to a nondestructive inspection apparatus for performing a nondestructive inspection on the components located in a small gap within a structure such as a pressure vessel of an atomic reactor.

DESCRIPTION OF THE RELATED ART

In an atomic reactor of an atomic power plant, it is provided with an ECCS (Emergency Core Cooling System) which supplies cooling water to a reactor core during an emergency situation. The cooling water from the ECCS is supplied into an atomic reactor pressure vessel through a cooling water inlet nozzle which penetrates through a reactor wall of the atomic reactor pressure vessel.

A core spray line is established on the cooling water inlet nozzle at an inner side of the atomic reactor pressure vessel. The core spray line is connected to a core spray sparger which is an annular pipe. The cooling water is sprayed into the atomic reactor pressure vessel from a nozzle formed on the core spray sparger.

The cooling water is supplied to a header of the core spray line from a thermal sleeve formed in the cooling water inlet nozzle. The thermal sleeve is established at a predetermined gap from the wall surface of the atomic reactor pressure vessel where the cooling water inlet nozzle is formed (hereafter referred to as "wall surface of the cooling water inlet nozzle") to relieve the thermal stress produced in the cooling water inlet nozzle. Therefore, a ring-like small gap (annular gap) is formed between the thermal sleeve and the cooling water inlet nozzle.

An atomic reactor pipe inspection apparatus for performing a nondestructive inspection on such an annular gap is proposed by Japanese Laid-Open Publication number 2002-148385. The atomic reactor pipe inspection apparatus proposed by the Japanese application is designed for a nondestructive inspection on a location at which the core spray line and the core spray sparger are welded to one another. This atomic reactor pipe inspection apparatus is hung inside the core from the top of the reactor, where it is positioned and fixed with reference to the header of the core spray sparger. The atomic reactor pipe inspection apparatus includes a scanner means for scanning along the axial and circumferential direction of the core spray sparger which is an annular pipe. An inspection head is supported on the scanner means, where it scans and performs a nondestructive inspection with respect to the location at which the spray line header (which is the annular gap) and the core spray sparger are welded to one another.

However, the atomic reactor pipe inspection apparatus requires a certain amount of space around the core spray sparger which is the object of inspection, because the atomic reactor pipe inspection apparatus is positioned on the surface of the core spray sparger and the scanner means supporting the inspection head scans the core spray sparger in the axial direction as well as in the circumferential direction. Due to this requirement, while the annular gap is formed between the wall surface of the thermal sleeve and the wall surface of the cooling water inlet nozzle, the scanner means cannot move around within such a small annular gap, hence, it is not possible to perform an inspection for welded location on the thermal sleeve.

The thermal sleeve is made of, for example, the same material as that of the atomic reactor pressure vessel (carbon steel) or a different material such as SUS (Stainless Used Steel). In either case, the thermal sleeve is welded to the atomic reactor pressure vessel. Therefore, it is preferable that the welded location of the thermal sleeve is inspected. However, in the conventional technology, it is not possible to inspect the welded location since the space between the thermal sleeve and the cooling water inlet nozzle is a small annular gap.

SUMMARY OF THE INVENTION

It is, therefore, an object of the present invention to provide a nondestructive inspection apparatus which is capable of inspecting an inside of a gap which is formed in a structure.

It is another object of the present invention to provide a nondestructive inspection apparatus which is capable of inspecting structural components in an annular gap formed in an atomic reactor pressure vessel.

The object of the present invention noted above is achieved by establishing the following configuration of the present invention.

The nondestructive inspection apparatus for performing a nondestructive inspection on the components located in the annular gap within the atomic reactor pressure vessel is comprised of:

a main body hung from the top of the atomic reactor pressure vessel where the main body reaches the header of the core spray line connected to the thermal sleeve within the cooling water inlet nozzle that supplies the cooling water into the atomic reactor pressure vessel, a fixing unit for fixing the main body on the core spray line by clamping the main body at the top and bottom at the location of the header, a scanner for moving the tape probe attached with an inspection head at the tip thereof in an axial direction of the annular gap formed between the wall surface of the thermal sleeve and the wall surface of the cooling water inlet nozzle, and a guide rail for guiding the scanner formed on the main body to a circumferential direction of the annular gap.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
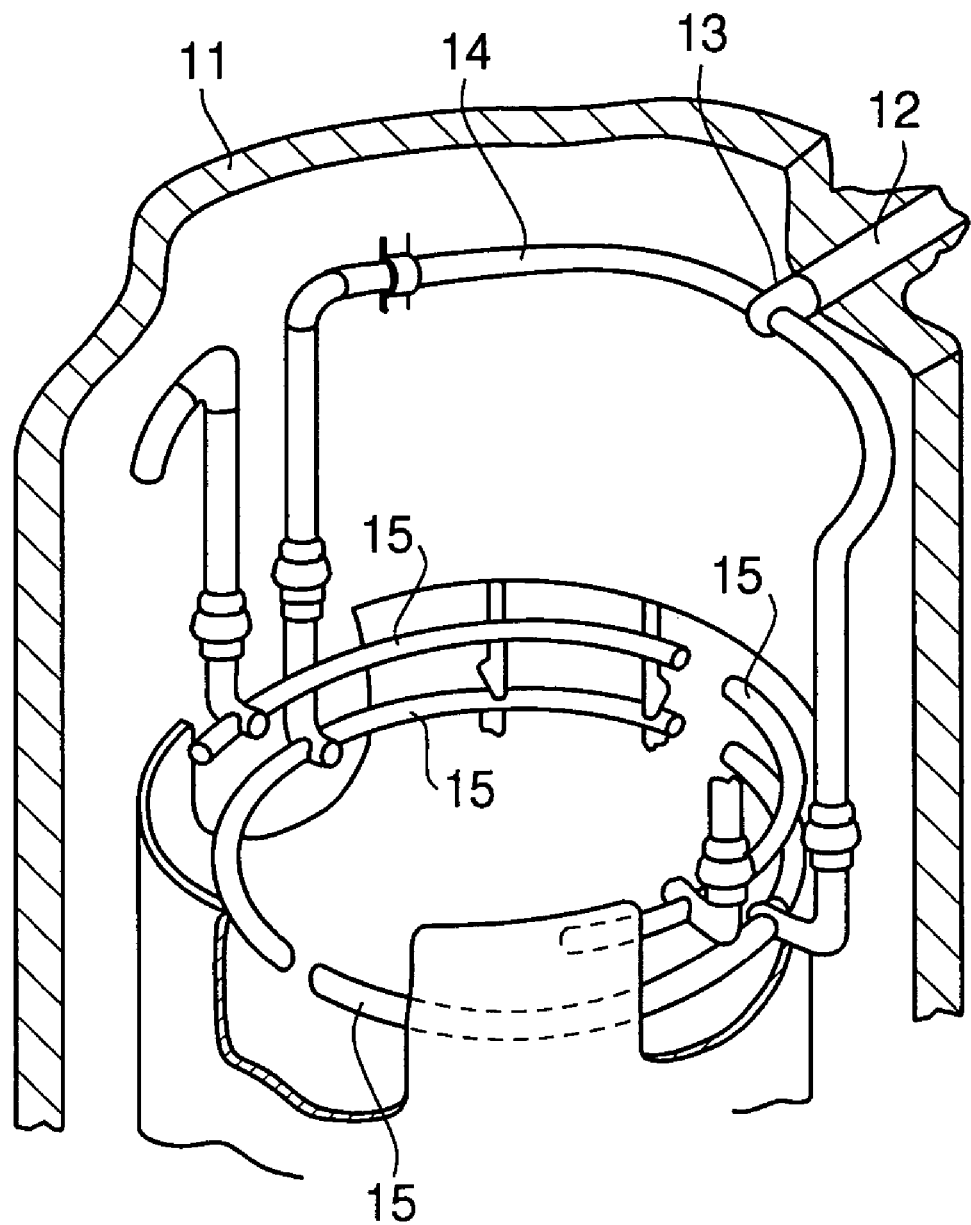
FIG. 1 is a perspective view showing an example of piping configuration in the atomic reactor pressure vessel.

Referring now to the drawings, where like reference numerals designate identical or corresponding parts throughout the several views, first, a thermal sleeve to be inspected will be explained with reference to FIGS. 1 and 2. FIG. 1 is a perspective view of a piping configuration within an atomic reactor pressure vessel. A cooling water inlet nozzle 12 is established through the core wall of an atomic reactor pressure vessel 11, where the cooling water is supplied to a header 13 of a core spray line 14 within the atomic reactor pressure vessel from the cooling water inlet nozzle 12. The core spray line 14 is connected to the header 13 and is also connected to a core spray sparger 15 which is an annular pipe. The core spray sparger 15 is located along an inner core wall of the atomic reactor pressure vessel 11, and sprays the cooling water from a nozzle (not shown) to the entire atomic reactor pressure vessel 11 in a circumferential direction.

Figure 2:
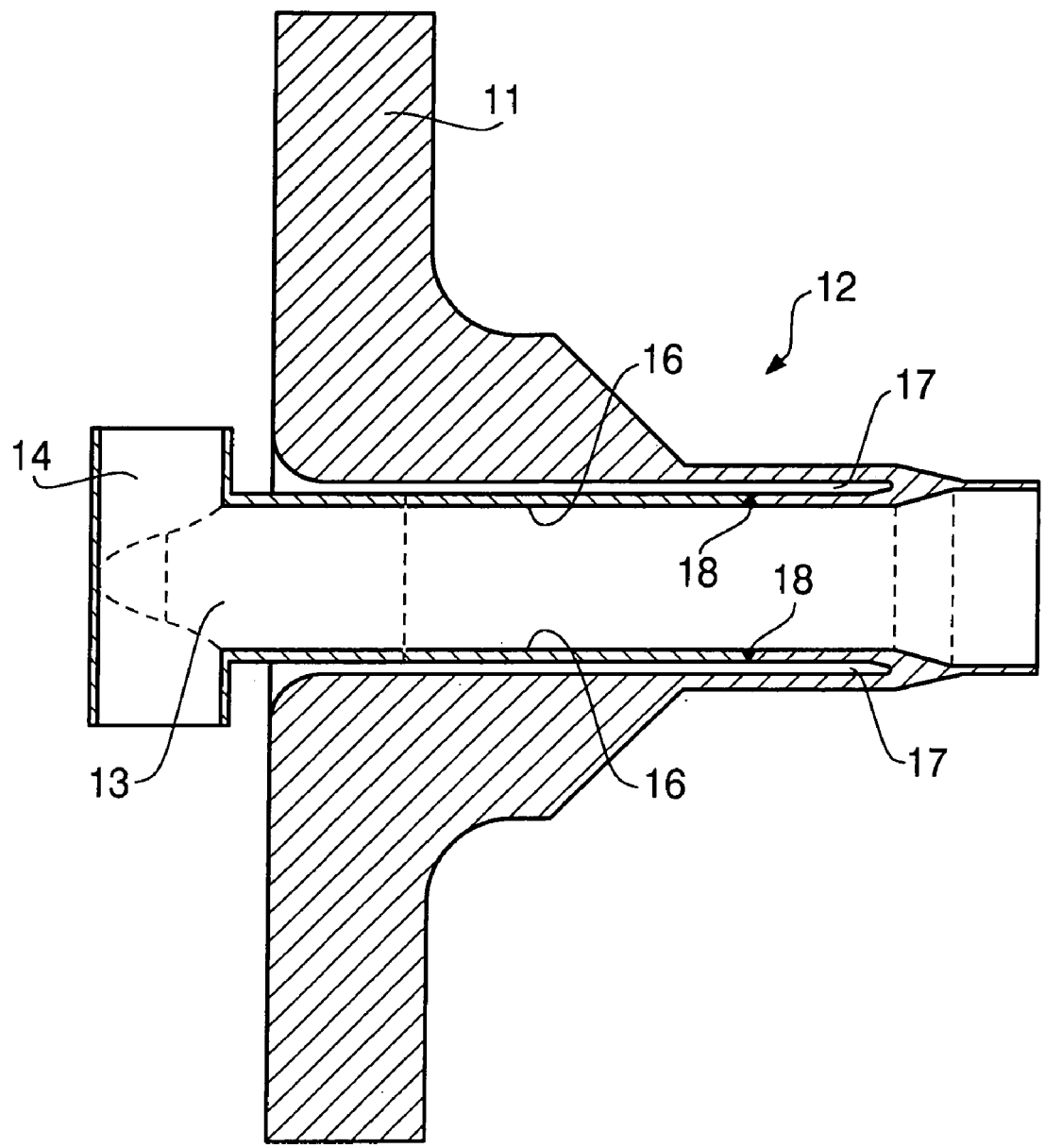
FIG. 2 is a cross-sectional view showing an example of a cooling water inlet nozzle in the atomic reactor pressure vessel.

FIG. 2 is a cross sectional view of the cooling water inlet nozzle 12. A thermal sleeve 16 is established within the cooling water inlet nozzle 12. The thermal sleeve 16 is a pipe that maintains a predetermined gap from the wall surface of the cooling water inlet nozzle 12 to relieve the thermal stress of the atomic reactor pressure vessel 11. As a consequence, a small annular gap 17 is formed between the wall surface of the thermal sleeve 16 and the wall surface of the cooling water inlet nozzle 12.

The thermal sleeve 16 is attached to the atomic reactor pressure vessel through welding. The nondestructive inspection apparatus of the present invention is to inspect any defects arising in the welded location 18, where it performs the inspection by inserting an inspection head in the annular gap 17.

Figure 3:
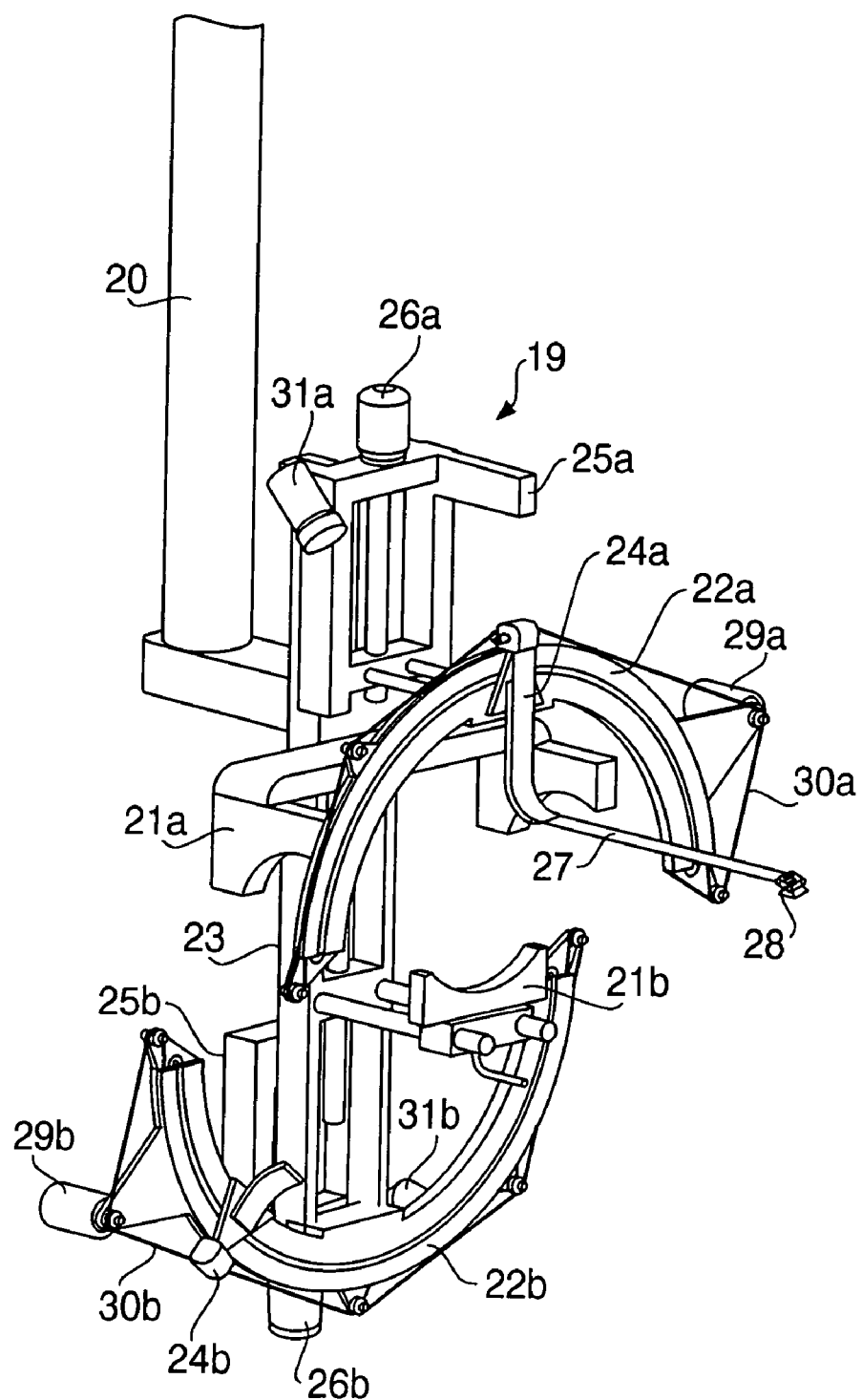
FIG. 3 is a perspective view showing an example of nondestructive inspection apparatus in accordance with the embodiment of the present invention.

FIG. 3 is a perspective view of the nondestructive inspection apparatus in accordance with the embodiment of the present invention. A main body 19 of the nondestructive inspection apparatus includes a hanging frame (positioning mechanism) 20 which is to hang the main body from the top of the atomic reactor pressure vessel and a main frame 23. The main frame 23 of the main body 19 is formed of a fixing unit for fixing the main body 19 to the core spray line 14. The fixing unit is configured by an upper fixing unit 21a and a lower fixing unit 21b. The upper fixing unit 21a is established on the main frame 23 of the main body 19, and the lower fixing unit 21b is established under the upper fixing unit 21a on the main frame 23 of the main body 19 while facing the upper fixing unit 21a. The lower fixing unit 21b is designed to be movable in an up and down direction. The upper fixing unit 21a is positioned on an upper surface of the core spray line 14, and the lower fixing unit 21b is moved upward to hold the thermal sleeve 16 at the bottom of the header 13 to fix the main body 19 on the core spray line 14. In other words, the upper fixing unit 21a and the lower fixing unit 21b clamp the core spray line 14 to fix the main body 19 to the atomic reactor pressure vessel.

Further, the main frame 23 of the main body 19 has a guide rail for guiding the movement of the scanner in a transversal direction, for example, a circumference direction corresponding to the annular gap 17. The guide rail is configured by an upper guide rail 22a and a lower guide rail 22b. A scanner (first scanner) 24a is mounted on the upper guide rail 22a so that the movement of the scanner 24a is guided by the upper guide rail 22a. Similarly, a scanner (second scanner) 24b is mounted on the lower guide rail 22b so that the movement of the scanner 24b is guided by the lower guide rail 22a.

The upper guide rail 22a is attached to the main frame 23 of the main body 19 through a holder 25a. The holder 25a is established on the main frame 23 of the main body 19 in a manner to be movable in a vertical direction. The holder 25a is driven up and down by a motor 26a. Similarly, the lower guide rail 22b is attached to the main frame 23 of the main body 19 through a holder 25b. The holder 25b is established on the main frame 23 of the main body 19 in a manner to be movable in a vertical direction. The holder 25b is driven up and down by a motor 26b.

Each of the scanners (first and second scanners) 24a and 24b includes a tape probe 27 having a structure of measuring tape, i.e., a thin and flat structure, which is retractable and extendable from a storage. In FIG. 3, the scanner (first scanner) 24a shows the state of the tape probe 27 where it is pulled out, and the scanner (second scanner) 24b shows the state of the tape probe 27 where it is retracted. An inspection head 28 is mounted at the end of the tape probe 27 of each of the scanners 24a and 24b. The inspection head 28 is mounted at the end of the tape probe 27 by, for example, magnetic or mechanical means. The tape probe 27 having the inspection head 28 is inserted in the annular gap 17 formed between the wall surface of the thermal sleeve 16 and the wall surface of the cooling water inlet nozzle 12 in an axial direction. By adjusting the length of the tape probe 27 that is being delivered, the inspection head 28 can move within the annular gap 17 in the axial direction.

Further, the scanner 24a mounted on the upper guide rail 22a moves on the upper guide rail 22a through a wire 30a by the movement of the motor 29a. Similarly, the scanner 24b mounted on the lower guide rail 22b moves on the lower guide rail 22b through a wire 30b by the movement of the motor 29b. In other words, the upper guide rail 22a guides the scanner 24a through an upper half circumference of the annular gap 17 in the circumferential direction, and the lower guide rail 22b guides the scanner 24b through a lower half circumference of the annular gap 17 in the circumferential direction. As a consequence, the inspection head 28 mounted at the end of the tape probe 27 can move within the annular gap 17 in the circumferential direction.

Monitoring cameras 31a and 31b are respectively mounted on the holders 25a and 25b, thereby monitoring the operations of the upper guide rail 22a and the lower guide rail 22b as well as the movement of the scanner 24.

Figure 4:
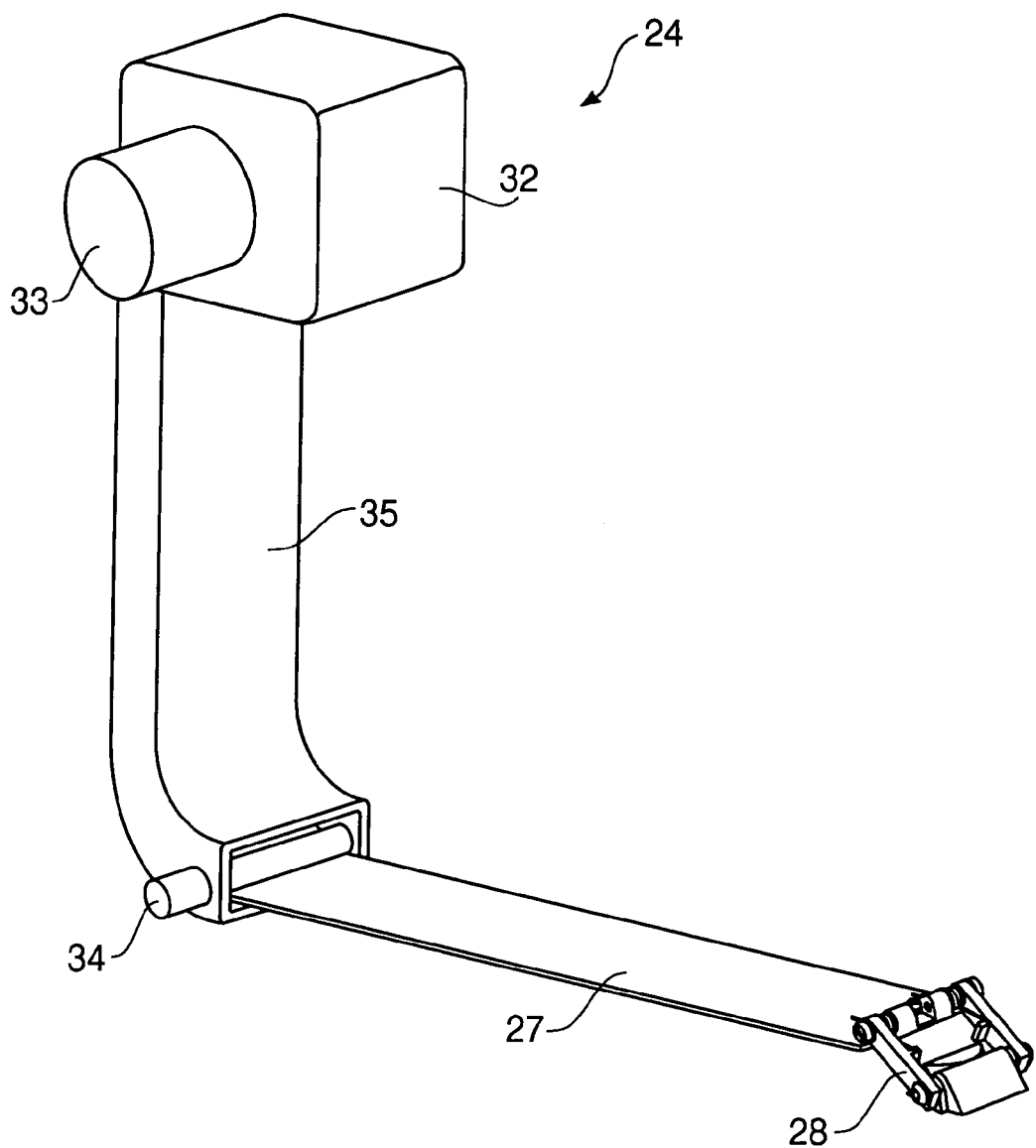
FIG. 4 is a perspective view showing an example of scanner incorporated in the nondestructive inspection apparatus according to the embodiment of the present invention.

FIG. 4 is a perspective view showing an example of structure of the scanner 24. The scanner 24 is configured by a storage 32 for storing the tape like member of the tape probe 27 when it is retracted, a drive motor 33 for delivering or retracting the tape probe 27, a guide 35 for guiding the tape probe 27 when it is delivered or retracted, an auxiliary motor 34 provided at an outlet area of the guide 35 for supporting the delivery and retraction actions of the tape probe 27, and an inspection head 28 mounted at the end of the probe tape 27 in the side of the thermal sleeve 16.

The tape probe 27 is made of material which is flexible enough for retracting the tape as well as rigid enough for scanning the inspection head 28. The storage 32 includes a cylinder for retracting the tape probe 27. By rotating the cylinder by the drive motor 33, the tape probe 27 is retracted and stored in the storage 32. On the other hand, when the tape probe 27 stored in the storage 32 is going to be delivered, the drive motor 33 is rotated in the opposite direction. In this case, the auxiliary motor 34 at the guide 35 is activated to promote the smooth delivery and retraction of the tape probe 27 driven by the drive motor 33.

Figure 5:
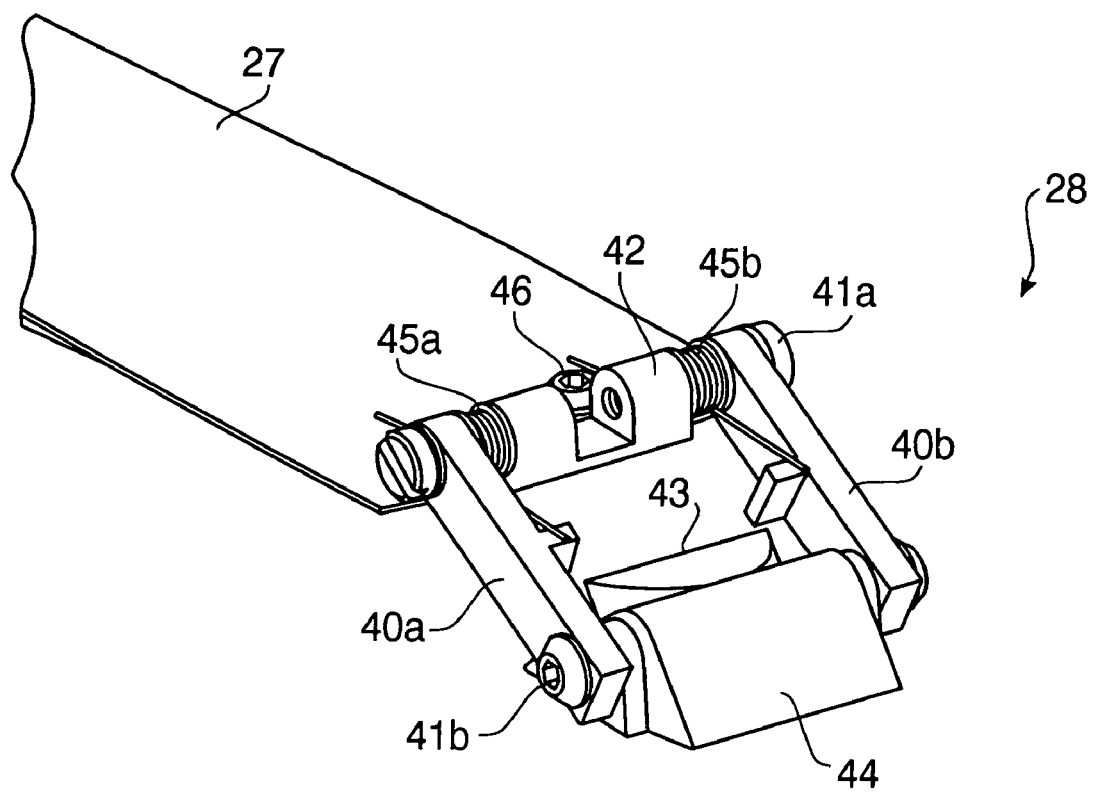
FIG. 5 is a detailed view showing an example of an inspection head incorporated in the nondestructive inspection apparatus according to the embodiment of the present invention.

FIG. 5 is a detailed view of the inspection head 28. The inspection head 28 is established at the end of the tape probe 27. The inspection head 28 is configured by a pair of linkage arms 40a-40b both ends of which are rotatably connected with a pair of pivot joints 41a-41b, a linkage member 42 provided on the first pivot joint 41a, and a shoe 44 provided on the second pivot joint 41b where a sensor 43 is mounted on the shoe 44. The shoe 44 having the sensor 43 is mounted on the inspection head 28 such that it will contact the thermal sleeve 16 to be inspected.

The linkage member 42 is attached to the tape probe 27 by a screw 46. Torsion springs 45a-45b are provided on the linkage member 42. The torsion springs 45a-45b along with the pair of pivot joints 41a-41b connected to the pair of linkage arms 40a-40b in a rotatable manner create a mechanism (pivotal structure that pivots the inspection head 28 relative to the tape probe 27) for pressing the shoe 44 against the wall surface of the thermal sleeve 16.

Namely, one end of each of the torsion springs 45a-45b contacts the tape probe 27 while the other end of each of the torsion springs 45a-45b contacts the stopper of the linkage arms 40a-40b. The torsion springs 45a-45b apply a rotational force to the linkage arms 40a-40b about the first pivot joint 41a as an axis. In other words, the torsion springs 45a-45b generate a pressure force that presses the shoe 44 that is pivotally mounted on the second pivot joint 41b against the wall surface of the thermal sleeve 16.

As for the sensor 43 on the inspection head 28, an ultrasonic sensor (UT sensor) or an excess current sensor (ECT sensor) can be preferably used. When using a UT sensor or ECT sensor, since the sensor 43 has to contact the wall surface of the thermal sleeve 16 to be inspected, the torsion springs 45a-45b are used to press the sensor 43 against the wall surface of the thermal sleeve 16. When using an internally visual mirror (endoscope) in place of the sensor 43, a mechanism for changing the direction of the mirror will be installed in place of the mechanism for pressing the sensor against the wall surface of the thermal sleeve 16.

Figure 6:
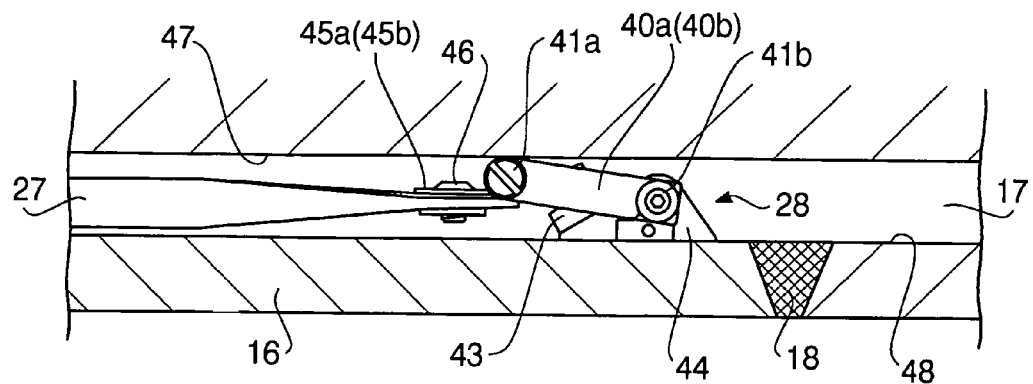
FIG. 6 is a side view showing the inspection head of the present invention when the inspection head is inserted in a small annular gap.
Figure 7:
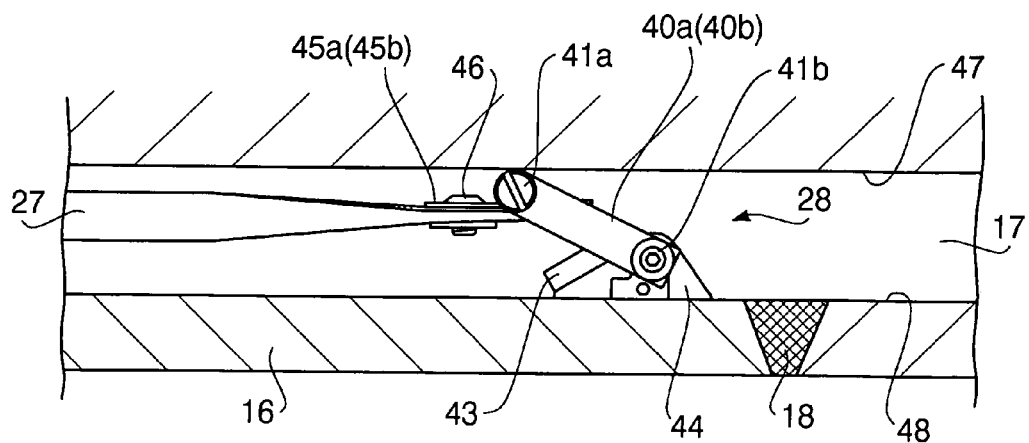
FIG. 7 is a side view showing the inspection head of the present invention when the inspection head is inserted in an annular gap larger than that of FIG. 6.

FIG. 6 is a side view of the inspection head 28 when inserted in the narrow annular gap 17, and FIG. 7 is a side view of the inspection head 28 when inserted in an annular gap 17 larger than that of FIG. 6.

As shown in FIG. 6 and FIG. 7, the inspection head 28 attached to the end of the tape probe 27 through the screw 46 presses the shoe 44 against the wall surface 48 of the thermal sleeve 16 by the mechanism formed with the torsion springs 45a-45b and the pair of pivot joints 41a-41b rotatably connected to the pair of linkage arms 40a-40b. Therefore, regardless of the size of the annular gap 17, the first pivot joint 41a contacts the wall surface 47 of the cooling water inlet nozzle 12, and the shoe 44 contacts the wall surface 48 of the thermal sleeve 16.

When the annular gap 17 is small, the return amount of the torsion springs 45a-45b is small, hence, a relatively high pressure force from the shoe 44 is applied to the wall surface 48 of the thermal sleeve 16. On the other hand, when the annular gap 17 is large, the return amount of the torsion springs 45a-45b is large, hence, a relatively low pressure force from the shoe 44 is applied against the wall surface 48 of the thermal sleeve 16.

Figure 8:
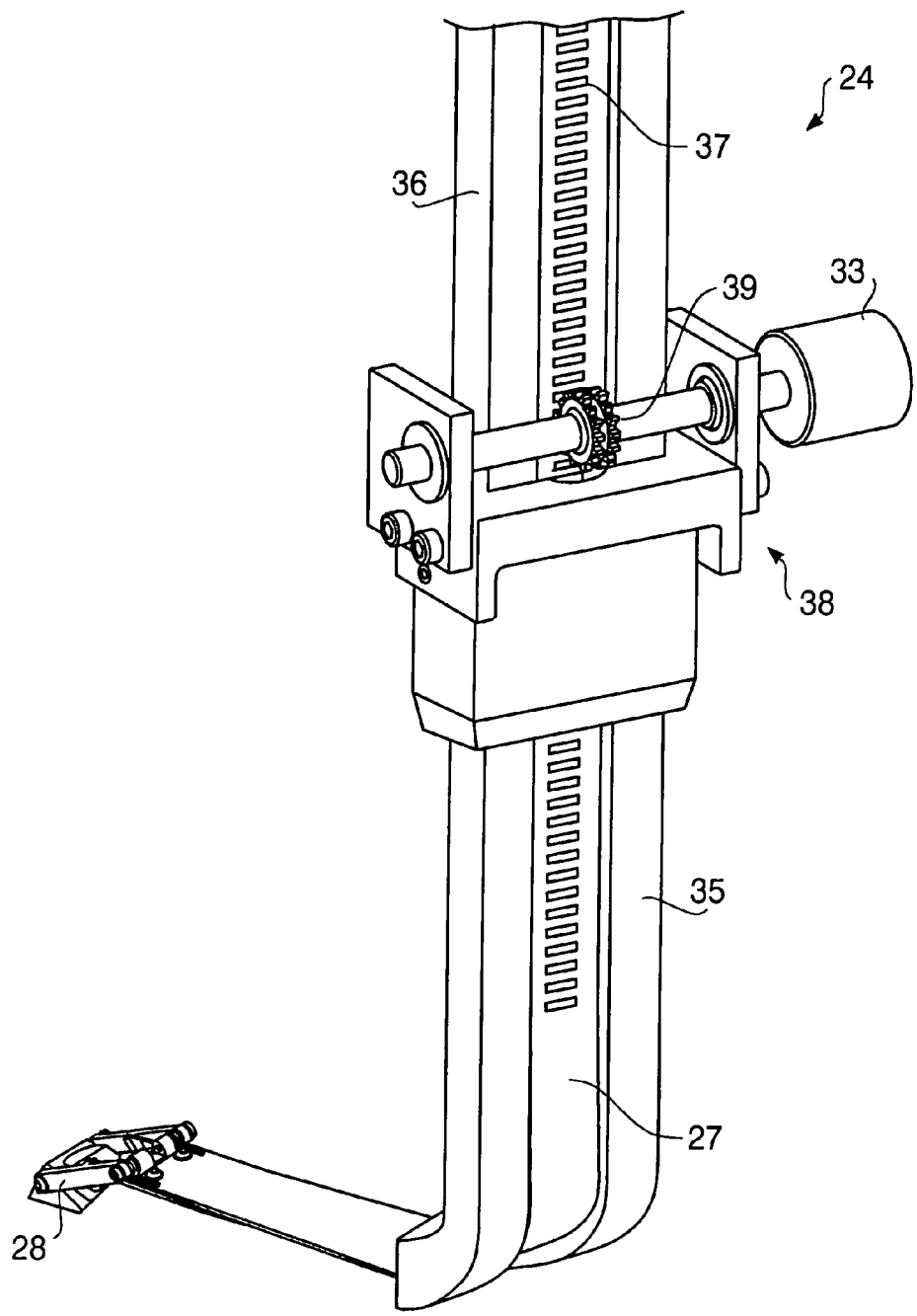
FIG. 8 is a perspective view showing another example of scanner in the nondestructive inspection apparatus according to the embodiment of the present invention.

FIG. 8 is a perspective view of another example of the scanner 24. Unlike the scanner shown in FIG. 4, the scanner 24 in FIG. 8 has a slide storage 36 for slidably storing the extra length of the tape probe 27 that is not delivered forward in place of the storage 32 of FIG. 4 which rotatably stores the tape probe 27. In FIG. 8, the same elements as shown in FIG. 4 are denoted by the same reference numerals, and the duplicated explanation will be abbreviated.

The tape probe 27 is made of material which is flexible enough for retracting the tape as well as rigid enough for scanning the inspection head 28. Engagement holes 37 are formed at the end of the tape probe 27 that will be stored in the slide storage 36.

A tape probe drive mechanism 38 is established at an end of the slide storage 36. The tape probe drive mechanism 38 is configured by a gear 39 and a drive motor 33 for rotating the gear 39, thereby delivering the tape probe 27 towards the guide 35 or retracting the tape probe 27 towards the slide storage 36. Namely, the gear 39 of the tape probe drive mechanism 38 engages with the engagement holes 37 of the tape probe 27 and converts the rotational force by the drive motor 33 to a sliding force in the linear direction of the tape probe 27. As a consequence, the tape probe 27 can be delivered toward the guide 35 or retracted therefrom towards the slide storage 36.

Figure 9:
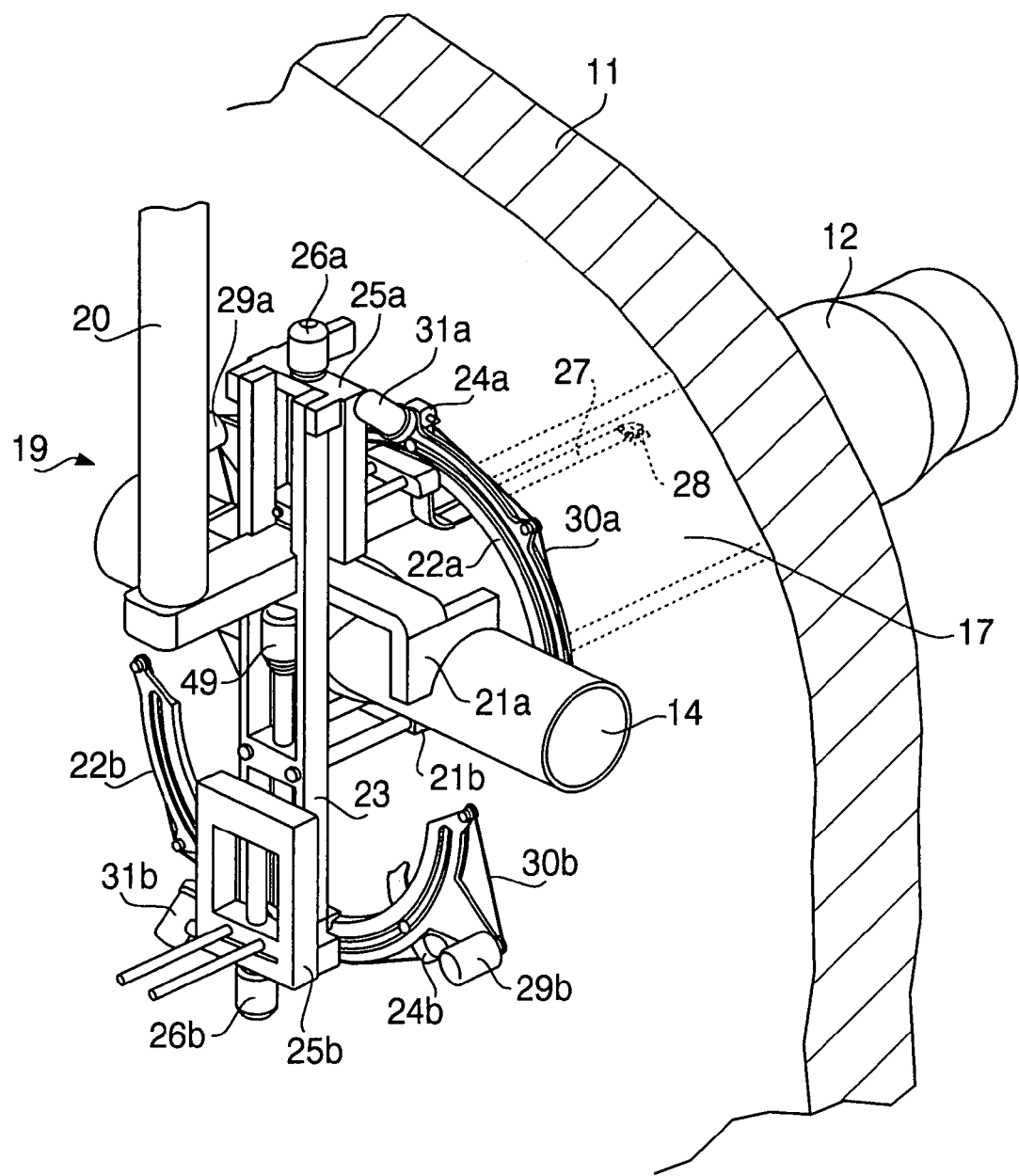
FIG. 9 is a perspective view showing the situation where the nondestructive inspection apparatus in the present invention is applied to inspect the welded location on the thermal sleeve to be inspected.

FIG. 9 is a perspective view of the nondestructive inspection apparatus in accordance with the embodiment of the present invention when it is applied to the inspection of the welded location of the thermal sleeve. The same elements as shown in FIG. 1 are denoted by the same reference numerals and the duplicated explanation will be abbreviated. The main body 19 of the nondestructive inspection apparatus hangs the hanging frame 20 from the top of the atomic reactor pressure vessel to reach the location of the header 13 of the core spray line 14 corresponding to the thermal sleeve 16 to be inspected. Then, the upper fixing unit 21a is positioned on the upper surface of the core spray line 14 located at the spray line header 13, and the motor 49 is activated to move the lower fixing unit 21b to the thermal sleeve 16 at the bottom of the header 13, where the upper fixing unit 21a and the lower fixing unit 21b hold the core spray line 14 at the header 13 and the thermal sleeve 16 from the top and bottom to fix the main body 19 to the core spray line 14.

Next, the motor 26a of the holder 25a is activated to position the upper guide rail 22a to the upper half circumference of the annular gap 17 of the thermal sleeve 16 to be inspected. Then, the tape probe 27 having the inspection head 28 at the end is delivered from the scanner 24a to the annular gap 17. Since the tape probe 27 is delivered to the annular gap 17 in an axial direction, it is delivered until the inspection head 28 reaches the welded location (welded line) on the thermal sleeve 16.

After that, the motor 29a is activated to move the scanner 24a on the upper guide rail 22a. Accordingly, the scanner 24a moves along the upper half circumference of the annular gap 17 in a circumferential direction, where the inspection head 28 mounted on the tape probe 27 moves along the welded location (welded line) of the thermal sleeve 16. The scanner 24a is moved along the entire area of the upper guide rail 22a, whereby the upper half circumference of the welded location (welded line) of the thermal sleeve 16 is inspected by the inspection head 28.

Similarly, the motor 26b of the holder 25b is activated to position the lower guide rail 22b to the lower half circumference of the annular gap 17 of the thermal sleeve 16 to be inspected. Then, the tape probe 27 having the inspection head 28 is delivered to the annular gap 17 from the scanner 24b. Since the tape probe 27 is delivered to the annular gap 17 in the axial direction, it is delivered until the inspection head 28 reaches the welded location (welded line) of the thermal sleeve 16.

After that, the motor 29b is activated to move the scanner 24b along the entire area of the upper guide rail 22b, where the lower half circumference of the welded location (welded line) of the thermal sleeve 16 is inspected by the inspection head 28 attached to the tape probe 27. As a result, the entire circumference of the welded location (welded line) of the thermal sleeve 16 can be inspected.

According to the embodiment of the present invention, so long as the gap of the annular gap 17 at the thermal sleeve 16 to be inspected is larger than the thickness of the tape probe 27 having the inspection head 28, the inspection head 28 can approach the welded line of the thermal sleeve 16. Further, since the inspection head 28 can move along the welded line of the thermal sleeve 16, a nondestructive inspection along the entire circumference of the welded line of the thermal sleeve 16 can be performed. Therefore, the reliability of the nuclear power plant is improved.

It should be noted that although the present invention has been described for the case of inspecting the inside of the annular gap for an illustration purpose, the present invention can be applied to any type or shape of gap so long as the thickness of the inspection head is smaller than the space of the gap. Further, in the foregoing, although the present invention has been described for the case of inspecting the structural components of the nuclear power plant, the basic concept of the present invention can be applied to any type of structure.

Obviously, numerous modifications and variations of the present invention are possible in light of the above teachings. It is therefore to be understood that within the scope of the appended claim, the invention may be practiced otherwise than as specifically described herein.

What is claimed is:

1. A nondestructive inspection apparatus for performing a nondestructive inspection on components located in an annular gap in an atomic reactor pressure vessel, comprising:
    a main body to be hung from a top of an atomic reactor pressure vessel until it reaches a position of a spray line header of a core spray line connected to a thermal sleeve within a cooling water inlet nozzle which supplies cooling water to the atomic reactor pressure vessel;
    a fixing unit established on the main body for fixing said main body to the core spray line by vertically holding said core spray line at said spray line header;
    a scanner for moving a tape probe in an axial direction of the annular gap formed between a wall surface of the thermal sleeve and a wall surface of the cooling water inlet nozzle; and
    a guide rail established on said main body for guiding said scanner in a circumferential direction of said annular gap.

2. A nondestructive inspection apparatus as defined in claim 1, wherein said scanner is comprised of a storage for retracting and storing an extra length of the tape probe, a drive motor for delivering or retracting the tape probe, and an inspection head attached to an end of the tape probe for inspecting said thermal sleeve.

3. A nondestructive inspection apparatus as defined in claim 1, wherein said scanner is comprised of a sliding storage for sliding and storing the tape probe, a drive motor for delivering or retracting the tape probe, and an inspection head attached to an end of said tape probe for inspecting said thermal sleeve.

4. A nondestructive inspection apparatus for performing a nondestructive inspection of an inside of a gap formed within a structure, comprising:
    a main body having a positioning mechanism to position the main body within the structure where the gap to be inspected is located;
    a fixing unit formed on the main body for fixing the main body positioned by the positioning mechanism to an inside of the structure; and
    a scanner formed on the main body for moving a tape probe in an intended direction of the gap;
    an inspection head formed at an end of the tape probe for inspecting the inside of the gap;
    wherein the inspection head has a pivotal structure so that an upper surface thereof contacts one surface of the gap while a lower surface thereof contacts another surface of the gap when the inspection head is inserted in the gap.

5. A nondestructive inspection apparatus as defined in claim 4, further comprising a guide rail established on the main body for guiding the scanner in a transversal direction corresponding to a shape of the gap to be inspected.

6. A nondestructive inspection apparatus as defined in claim 4, further comprising a guide rail established on the main body for guiding the scanner in a transversal direction corresponding to a shape of the gap, and wherein the scanner moves the tape probe in an axial direction of the gap, whereby positioning the inspection head to any desired locations in the gap to be inspected.

7. A nondestructive inspection apparatus as defined in claim 4, further comprising a guide rail established on the main body for guiding the scanner in a circumferential direction when the gap to be inspected is an annular gap, wherein said scanner is configured by a first scanner and a second scanner, and wherein the guide rail is configured by an upper guide rail for moving the first scanner corresponding to an upper circumference of the annular gap and a lower guide rail for moving the second scanner corresponding to a lower circumference of the annular gap.

8. A nondestructive inspection apparatus as defined in claim 4, wherein the pivotal structure of the inspection head is configured by a spring, a pivot joint, and a linkage arm assembled in a manner that the inspection head can pivot relative to the tape probe.

9. A nondestructive inspection apparatus as defined in claim 4, wherein the inspection head includes a sensor which is an ultrasonic sensor or an excess current sensor to inspect the inside of the gap.

10. A nondestructive inspection apparatus as defined in claim 4, wherein the fixing unit attaches the main body to the structure by clamping a part of the structure at the position determined by the positioning mechanism.

11. A nondestructive inspection apparatus as defined in claim 10, wherein the fixing unit is configured by an upper fixing unit which contacts with an upper surface of the part of the structure and an lower fixing unit which contacts with a lower surface of the part of the structure thereby vertically clamping the part of the structure to attach the main body to the structure.

12. A nondestructive inspection apparatus as defined in claim 4, wherein the tape probe has a thin and flat structure which is retractable and extendable from a storage so that the inspection head formed at the end of the tape probe can move back and forth within the gap.

13. A nondestructive inspection apparatus as defined in claim 4, wherein the scanner is comprised of a storage for retracting and storing an extra length of the tape probe, a drive motor for delivering or retracting the tape probe so that the inspection head formed at the end of the tape probe can move back and forth within the gap.

14. A nondestructive inspection apparatus as defined in claim 1, wherein the scanner is comprised of a sliding storage for slidably storing an extra length of the tape probe, a drive motor for delivering and retracting the tape probe stored in said sliding storage, wherein the tape probe includes engagement holes for receiving a driving force from the motor so that the inspection head formed at the end of the tape probe can move back and forth within the gap.

15. A nondestructive inspection apparatus for performing a nondestructive inspection of an inside of an annular gap formed within an atomic reactor pressure vessel, comprising:
   a main body having a positioning mechanism to determine a vertical position of the main body relative to the annular gap to be inspected;
   a fixing unit formed on the main body for fixing the main body positioned by the positioning mechanism to a core spray line in the atomic reactor pressure vessel;
   a scanner formed on the main body for moving a tape probe in an axial direction and a circumferential direction of the annular gap;
   an inspection head formed at an end of the tape probe for inspecting the inside of the annular gap;
   wherein the inspection head has a pivotal structure so that an upper surface thereof contacts one surface of the gap while a lower surface thereof contacts another surface of the gap when the end of the tape probe is inserted in the gap.

16. A nondestructive inspection apparatus as defined in claim 15, further comprising a guide rail established on the main body for guiding the scanner in the circumferential direction, wherein said scanner is configured by a first scanner and a second scanner, and wherein the guide rail is configured by an upper guide rail for moving the first scanner corresponding to an upper circumference of the annular gap and a lower guide rail for moving the second scanner corresponding to a lower circumference of the annular gap.

17. A nondestructive inspection apparatus as defined in claim 15, wherein the pivotal structure of the inspection head is configured by a spring, a pivot joint, and a linkage arm assembled in a manner that the inspection head can pivot relative to the tape probe.

18. A nondestructive inspection apparatus as defined in claim 15, wherein the fixing unit is configured by an upper fixing unit which contacts with an upper surface of the core spray line and an lower fixing unit which contacts with a lower surface of the core spray line thereby vertically clamping the core spray line to attach the main body to the atomic reactor pressure vessel.

19. A nondestructive inspection apparatus as defined in claim 15, wherein the tape probe has a thin and flat structure which is retractable and extendable from a storage so that the inspection head formed at the end of the tape probe can move back and forth within the annular gap.

20. A nondestructive inspection apparatus as defined in claim 15, wherein the scanner is comprised of a storage for retracting and storing an extra length of the tape probe, a drive motor for delivering or retracting the tape probe so that the inspection head formed at the end of the tape probe can move back and forth within the gap.

* * * * *